Sept. 16, 1930.  J. H. GOULD  1,775,638
STEAM HEATER FOR MOTOR VEHICLES
Filed Dec. 30, 1926  2 Sheets-Sheet 1
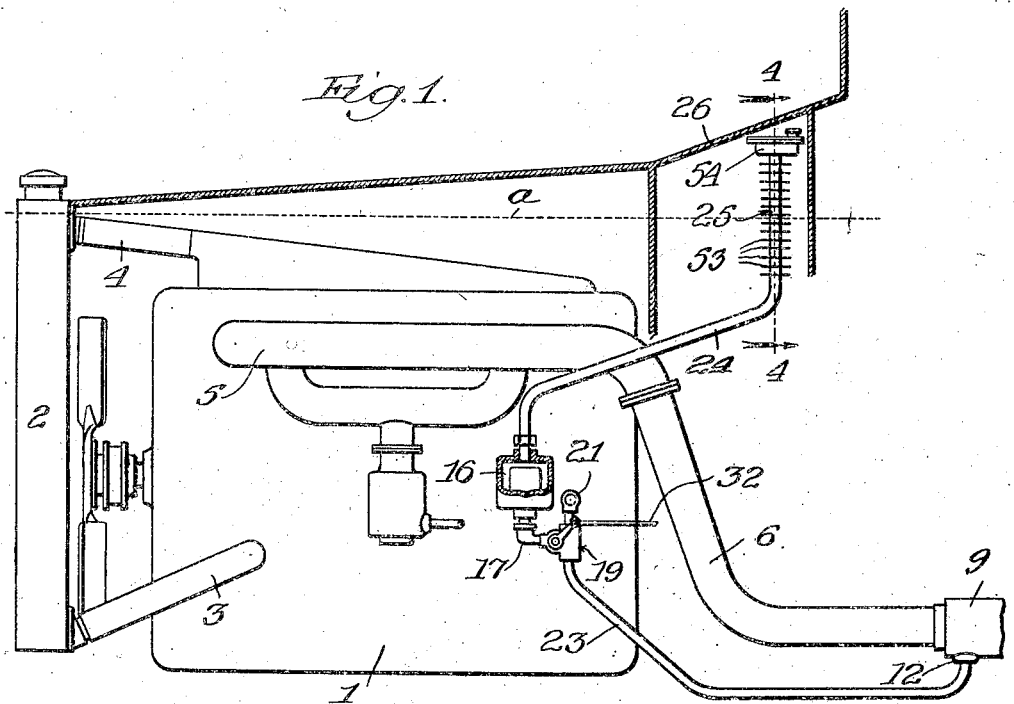
Fig.1.
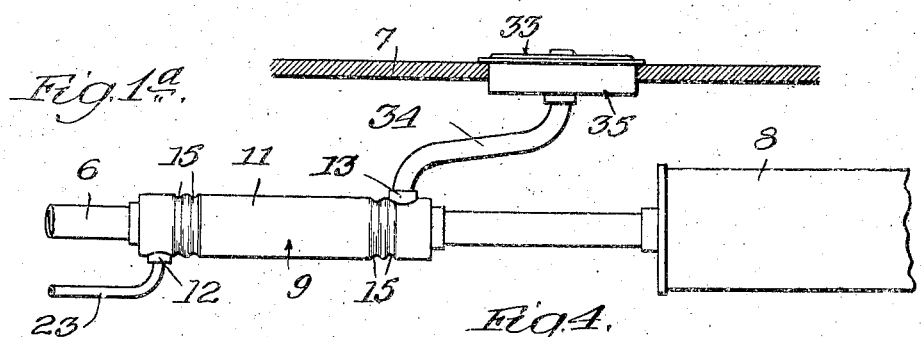
Fig.1ª.
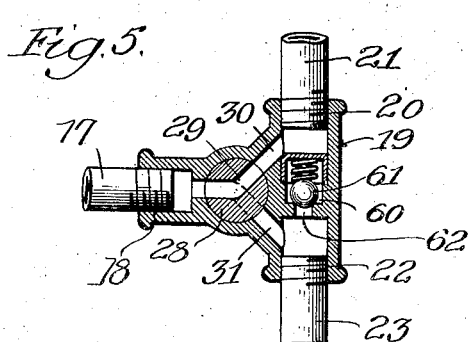
Fig.5.
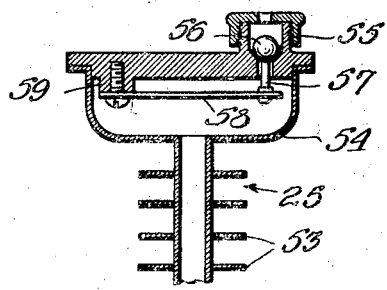
Fig.4.
Inventor
John H. Gould, Sept. 16, 1930.  J. H. GOULD  1,775,638
STEAM HEATER FOR MOTOR VEHICLES
Filed Dec. 30, 1926    2 Sheets-Sheet 2
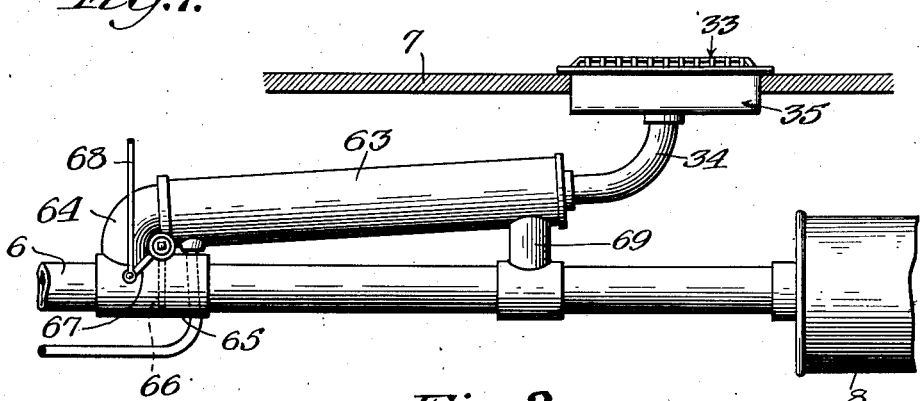
Inventor,
John H. Gould,
By [signature]
Atty Patented Sept. 16, 1930

1,775,638

UNITED STATES PATENT OFFICE

JOHN H. GOULD, OF DETROIT, MICHIGAN, ASSIGNOR TO McCORD RADIATOR & MFG. CO., OF DETROIT, MICHIGAN, A CORPORATION OF MAINE

STEAM HEATER FOR MOTOR VEHICLES

Application filed December 30, 1926. Serial No. 158,114.

This invention relates to heaters for motor vehicles.

One object of my invention is to supply the heater with steam furnished by a generator which is heated by the exhaust gases of the vehicle engine, and thus avoid the obnoxious exhaust gases entering the body of the car as with heaters which are heated directly by such gases, as now most generally employed.

Another object of my invention is to supply the generator with the liquids required from the liquid cooling system of the vehicle engine, so that a separate source of liquid supply will not be required.

A further object of my invention is to provide means for limiting the amounts of liquids supplied to the generator to less than the capacity of the same so that steam having a very high temperature may be furnished to the heater.

A still further object of my invention is to provide means allowing portions of the liquids supplied to the heating system to be automatically returned to the cooling system in case of excess pressures being generated in the heating system and thus reduce the steaming action of the latter, or all of the liquids in case the heating system is to be shut off.

A further object of my invention is to interpose a trap between the generator and its liquid supply so that the amounts of liquids supplied to the generator may be limited to the capacity of the trap and thus avoid the possibility of completely filling the generator, as would occur should it be directly connected with the liquid supply.

A further object of my invention is to employ in connection with the trap a vented condenser extending above the level of the liquid supply so as to control the steaming action of the generator by serving to withdraw the liquids therefrom and return the same to the generator through the condensing action of the condenser.

A further object of my invention is to provide a heater and generator assembly which is not only simple in construction and operation, but which may be readily applied to a motor vehicle without requiring any material changing thereof.

The invention consists further in the features hereinafter described and claimed.

In the accompanying drawings—

Figs. 1 and 1ª are more or less diagrammatic views of a heater and generator assembly constructed in accordance with my invention and shown applied to a motor vehicle;

Fig. 2 is a longitudinal sectional view through the generator;

Fig. 3 is a transverse vertical sectional view through the generator on line 3—3 of Fig. 2;

Fig. 4 is an enlarged vertical sectional view taken through the condenser on line 4—4 of Fig. 1.

Fig. 5 is a sectional view through the valve fitting for controlling the water supply to the generator;

Fig. 6 is a vertical sectional view taken through one of the headers of the heater to show the vent valve construction for said header; and Fig. 7 is a side view showing the generator arranged alongside of the exhaust pipe with a cut-off valve between them to be hereinafter more fully described.

In Fig. 1, 1 indicates, conventionally, an internal combustion engine of the type usually employed on motor vehicles and having a radiator 2 in front of the same as a part of the cooling system of the engine, said radiator being connected with the water jacket of the engine by suitable conduits 3, 4, as customary in assemblies of this general kind. The engine has an exhaust manifold 5, to which is connected an exhaust pipe 6, the latter leading back under the floor 7 of the vehicle and terminating in a muffler 8 adjacent the rear thereof, as customary in motor vehicle design and as shown in Fig. 1ª.

Associated with the exhaust pipe 6 is a steam generator 9 of my invention. In the particular form of structure shown in Figs. 1, 2, and 3, the generator comprises a steam forming chamber 10 located within an outer casing or shell 11 and extending lengthwise thereof, as shown. The exhaust gases from the engine 1 are passed through the casing 11 so as to heat the chamber 10 therein, said casing in the form of structure shown in Figs. 1, 2, and 3 being set in the exhaust pipe 6 and forming a part thereof, as illustrated.

The casing 11 is larger than the chamber 10 so that the exhaust gases may pass through the casing 11 about the outside of the chamber 10 and contact with the outer wall thereof. The chamber 10 is also made tubular so that the exhaust gases may also pass through the same and contact with its inner wall. The chamber 10 has an inlet connection 12 at one end for liquids and an outlet connection 13 at its opposite end for steam. The chamber 10 is disposed in the casing 11 so that the inlet connection 12 is below the outlet connection 13. These connections extend through the casing 11 and support the chamber 10 therein, preferably at an inclination to the axis thereof and with the connection 12 at the lower end of the chamber so that liquids will accumulate at such lower end.

The chamber 10 and the casing 11 may be made of sheet metal and when so made the connections 12 and 13 are welded to the chamber and casing, respectively. When of sheet metal, the chamber 10 and casing 11 are so constructed that they may expand and contract under the different temperatures to which they are subjected. For this purpose, the inner wall of the chamber 10 is provided with corrugations 14, 14 extending about the adjacent opposite ends of the chamber. The casing 11 is provided with two sets of corrugations 15, 15, which extend about the same adjacent its opposite ends, preferably adjacent the inlet and outlet connections 12, 13, as shown in Fig. 1ª.

To supply water to the generator 9 so that steam may be produced in the chamber 10 from the heat of the exhaust gases passing through the generator, I provide the following construction. A hollow receptacle 16 constituting a water trap is located at the motor 1, preferably on the same side as the exhaust manifold 5 and below the level of the liquids of the cooling system of the motor. Associated with the trap 16 is a valve fitting 19 having a port 18 connected by a pipe 17 with the lower end of the trap. (See Fig. 5.) This fitting has a port 20 which is connected to the water jacket of the motor through a suitable fitting 21. The valve fitting 19 has a third port 22, which is connected by a conduit 23 with the inlet fitting 12 of the steam forming chamber 10 of the generator. A conduit 24 is connected with the upper end of the trap 16 and extends above the level of the water in the cooling system and terminates in a condenser 25, preferably located in the body of the car under the cowl 26 and to the rear of the dash 27, as shown in Fig. 1.

The fitting 19, as shown in Fig. 5, is provided with a valve in the form of a turning plug 28 having an angular passageway 29 adapted when the valve is turned in one position to connect the port 18 with the port 20 through a passage 30 interposed between them, and when turned in another position to connect the port 18 with the port 22 through a passage 31 also in the fitting. An operating rod 32 accessible from the inside of the car is connected with the valve plug 28 for turning the same.

When the plug is turned to connect the port 18 with the port 20, water is allowed to flow from the cooling system into the trap 16 and the connected conduit 24. These ports are so proportioned that when the water rises in the conduit 24 to the level of that in the cooling system (indicated by $a$ in Fig. 1) the amount of water entering from the cooling system will be less than the capacity of the steam forming chamber 10. This will allow steam to be generated in the chamber 10 to furnish heat of a high temperature for the vehicle heater. On turning the valve plug 28 to connect the port 18 with the port 22, the water tapped off from the cooling system will then flow by gravity into the chamber 10 and be converted into steam therein by the heat of the exhaust gases passing through the generator.

A heater 33 is set in the floor 7 of the car in any desired location as between the front and rear seats or in front of the front seat, and is connected by a suitable pipe or conduit 34 with the outlet 13 of the casing 10 so that steam generated in the casing may be supplied to the heater for car warming purposes. The heater assembly includes an outside casing or pan 35 set in the floor 7 of the car and having imperforate bottom and upright marginal walls, respectively. Located in the pan is the heating element of the assembly. This element is preferably in the form of a radiator having hollow headers at its opposite ends and connected by a plurality of pipes 40, 41 having suitable heat radiating fins about the exterior thereof.

The header 39 of the radiator is provided in its top wall with a vent opening 44 to allow for the escape of air from the radiator ahead of the advancing steam on starting the heater. A suitable valve member 45, preferably in the form of a plug, is located in the header 39 to open and close the opening 44. Said plug is carried at the free end of a thermal bar 46, which is secured at the opposite end to a lug 47 inside of the header, as shown in Fig. 6. The bar 46 acts under the high temperature of the steam coming in contact therewith as the heater fills with steam to close the vent opening 44 to prevent the escape of steam after the evacuation of the air so as to utilize all of the steam supplied to the heater for car warming purposes and moreover prevent any steam escaping into the car. On condensing of the steam, as when the engine is stopped, the bar 46 acts under the lowering of the temperature in the header to open the valve 45 and allow air to enter the heater to fill the space previously occupied by the steam, and thus maintain the heating system in a workable condition.

The condenser 25, as shown in Figs. 1 and 4, is in the form of a single upright pipe or tube, although a plurality of connected tubes may be employed if desired. This tube is provided on the outside with heat radiating fins 53, and it has an expansion chamber 54 at its upper end. This chamber has a vent passage or hole 55, preferably in its top wall, as shown in Fig. 4. A ball valve 56 is provided for the vent 55. Said valve is arranged to close the hole 55 from above and has a stem 57 extending downward through the hole and secured to the free end of a thermal rod or bar 58 inside of the chamber 54. The opposite end of this rod is secured to a lug 59 inside of the chamber.

Normally, the valve 56 is open to allow for the free egress and ingress of air as the water supply for the generator is first let into the conduit 24 and afterwards when supplying the generator as heretofore described. During the operation of the generator 9 the condenser 25 is open to the generator through the trap 16. Should the generator produce more steam than can be utilized by the heater 33, as when the engine is under heavy duty or in warm weather, the excess steam will find its way into the condenser, first displacing the air through the vent 55 and, on contact with the thermal bar 58, will effect a closing of the vent to prevent the escape of steam. The cooler air in contact with the outside of the condenser 25 and its fins 53 will serve to condense the steam in the condenser and thus reduce the excess steam. The reduction in pressure caused by the condensing of the steam will serve to draw liquids from the generator 9 and thus control the steaming action thereof.

The valve fixture 19 is provided with a passageway 60 extending therethrough and connecting the ports 20, 22. This provides a by-pass around the valve plug 28, as shown in Fig. 5. Located in the passage 60 is a spring pressed ball check valve 61, which is normally closed against a seat 62 for preventing steam and liquids in the heating system under normal pressure conditions from entering the water jacket of the engine. Under abnormal pressures in the heating system as when producing steam to such an extent that it can not be utilized by the heater, the excess pressures will open the valve 61 and allow the excess steam and any liquids carried thereby to enter the water jacket and thus relieve the heating system.

Instead of having the generator form a part of the exhaust pipe so that the exhaust gases constantly pass through the generator as shown in Fig. 1, I may locate the generator to one side of the exhaust pipe and connect it thereto through a valve fitting so that the flow of exhaust gases may be cut off from the generator when desired. As illustrated in Fig. 7, the generator 63, which is constructed and operated as before, has its inlet end 64 connected to a valve fitting 65 set in the exhaust pipe. The fitting 65 contains a swinging valve plate 66 having an arm 67 on the outside of the fitting and operated by a pull rod 68, which leads into the car, preferably through the floor 7 thereof for accessibility. When the valve plate 66 extends across the passage through the fitting 65, the exhaust gases from the engine will be deflected into the generator and pass therethrough and return to the portion of the exhaust pipe to the rear of the valve 66 through a connection 69 between the outlet end of the generator and said exhaust pipe. When the valve 66 closes the passage between the fitting 65 and the inlet end of the generator, the latter will be shut off and no exhaust gases will pass through the same. The generator 63 is connected with the water supply and the heater 33 as before.

The details of structure shown and described may be variously changed and modified without departing from the scope of my invention.

I claim as my invention:

1. The combination with an internal combustion engine having a liquid cooling system, of a heater, a steam generator heated by the exhaust gases of the engine and connected with the heater for supplying steam thereto, a trap interposed between the cooling system and generator and connected therewith for supplying a measured amount of liquid to the generator from the system, and valve means for closing the trap to the cooling system when open to the generator.

2. The combination with an internal combustion engine having a liquid cooling system, of a heating system including a heater, a steam generator heated by the exhaust gases of the engine and connected with the heater for supplying steam thereto, a trap interposed between the cooling system and the generator for supplying measured amounts of liquid to the generator from the cooling system, and pressure responsive means in the heating system and permitting the return of liquid to the cooling system from the heating system under excess pressures in the latter when the trap is closed to the generator.

3. The combination with an internal combustion engine, of a heater, a steam generator heated by the exhaust gases of the engine and connected with the heater for supplying steam thereto, a liquid supply for the generator, valve means in the connection between the liquid supply and the generator for controlling the supply thereto, and pressure responsive means providing a by-pass around said valve means so that the liquid in the generator may be returned to the liquid supply when the latter is closed to the generator by said valve.

4. The combination with an internal combustion engine, of a heater, a steam generator heated by the exhaust gases of the engine and connected with the heater for supplying steam thereto, a liquid supply for the generator, a trap interposed betweeen the liquid supply and the generator and connected therewith for furnishing liquid to the generator through the trap, and an atmospheric vent for the trap above the liquid supply.

5. The combination with an internal combustion engine, of a heater, a steam generator heated by the exhaust gases of the engine and connected with the heater for supplying steam thereto, a liquid supply for the generator, a trap interposed between the liquid supply and the generator and connected therewith for furnishing liquid to the generator through the trap, an atmospheric vent for the trap above the liquid supply, and means associated with the vent for closing the same when steam reaches the vent from the generator.

6. The combination with an internal combustion engine, of a heater, a steam generator heated by the exhaust gases of the engine and connected with the heater for supplying steam thereto, a liquid supply for the generator, a trap located below the level of the liquid supply and connected therewith and with the generator for supplying liquid to the latter through the trap, and means above the trap and connected therewith for venting the same and serving to condense the steam rising thereto from the generator.

7. A steam heating system for motor vehicles, comprising in combination with the vehicle engine, its liquid cooling system and exhaust pipe, a heater for the vehicle, a steam generator associated with the exhaust pipe and heated by the exhaust gases passing therethrough, means connecting the generator to the heater for supplying steam thereto, and means connecting the generator with the cooling system for supplying liquid to the generator from said system.

8. A steam heating system for motor vehicles, comprising in combination with the vehicle engine, its liquid cooling system and exhaust pipe, a heater for the vehicle, and a steam generator associated with the exhaust pipe and heated by the exhaust gases passing therethrough, means connecting the generator to the heater for supplying steam thereto, and means connecting the generator with the cooling system for supplying liquid to the generator from said system, said means limiting the amount of liquid supplied to the generator to less than the capacity of the latter.

9. A steam heating system for motor vehicles, comprising in combination with the vehicle engine, its liquid cooling system and exhaust pipe, a heater for the vehicle, a steam generator associated with the exhaust pipe and heated by the exhaust gases passing therethrough, means connecting the generator to the heater for supplying steam thereto, a conduit connecting the generator with the cooling system for supplying liquid to the generator from said system, and a trap and valve means included in said conduit for limiting the amount of liquid supplied to the generator from the cooling system.

10. A steam heating system for motor vehicles, comprising in combination with the vehicle engine, its liquid cooling system and exhaust pipe, a heater for the vehicle, a steam generator associated with the exhaust pipe and heated by the exhaust gases passing therethrough, means connecting the generator with the heater for supplying steam thereto, means connecting the generator with the cooling system for supplying liquid to the generator from the cooling system, and means responsive to excessive pressures produced in the heating system to relieve the same.

In testimony whereof I affix my signature this 28th day of December, 1926.

JOHN H. GOULD.